(12) United States Patent
Johnson et al.

(10) Patent No.: US 6,185,024 B1
(45) Date of Patent: Feb. 6, 2001

(54) LASER MULTIPLEXING SYSTEM

(75) Inventors: Steve A. Johnson; Ronald Edward English, Jr., both of Tracy; Ronald K. White, Livermore, all of CA (US)

(73) Assignee: United States Enrichment Corporation, Bethesda, MD (US)

( * ) Notice: Under 35 U.S.C. 154(b), the term of this patent shall be extended for 0 days.

(21) Appl. No.: 07/804,347

(22) Filed: Dec. 5, 1991

(51) Int. Cl.[7] .................. H04B 9/00; G02B 6/26
(52) U.S. Cl. ............... 359/133; 359/349; 359/629; 372/70
(58) Field of Search .................. 359/115, 133, 359/134, 349, 618, 629; 358/226; 372/70

(56) References Cited

U.S. PATENT DOCUMENTS

| | | | |
|---|---|---|---|
| 4,860,279 | * | 8/1989 | Falk et al. .......................... 359/133 |
| 4,882,775 | * | 11/1989 | Coleman .............................. 359/133 |
| 5,039,190 | * | 8/1991 | Blonder ............................... 359/341 |
| 5,109,447 | * | 4/1992 | Chan .................................. 385/45 |
| 5,200,964 | * | 4/1993 | Huber .................................. 372/26 |

OTHER PUBLICATIONS

Becker et al, IEEE Photonics Technology Letters, Sep. 1989; #9, pp. 267–269.*

* cited by examiner

*Primary Examiner*—Nelson Moskowitz
(74) *Attorney, Agent, or Firm*—Townsend and Townsend and Crew

(57) ABSTRACT

A plurality of copper lasers, as radiant power sources, emits a beam of power carrying radiation. A plurality of fiber injection assemblies receives power from the plurality of copper lasers and injects such power into a plurality of fibers for individually transmitting the received power to a plurality of power-receiving devices. The power-transmitting fibers of the system are so arranged that power is delivered therethrough to each of the power-receiving devices such that, even if a few of the radiant power sources and/or fibers fail, the power supply to any of the power receiving devices will not completely drop to zero but will drop by the same proportionate amount.

11 Claims, 3 Drawing Sheets

LASER MULTIPLEXING SYSTEM

The United States Government has rights in this invention pursuant to contract number W-7405-ENG-48 between the United States Department of Energy and the University of California, for the operation of Lawrence Livermore National Laboratory.

BACKGROUND OF THE INVENTION

This invention relates to a laser multiplexing system and more particularly to a system whereby pulse signals can be delivered reliably from a plurality of lasers to a plurality of power-receiving devices.

In applications where a plurality of power-receiving devices are operated by pulse signals from more than one power-delivering laser such as copper lasers, it is important that these pulse signals are sure to be received by all of the target power-receiving devices even if some of the power-delivering lasers have failed. This is particularly true where the operations of these devices are mutually dependent such that a failure of one device to receive an intended pulse signal leads to a failure of a larger system to which others of these devices may belong.

SUMMARY OF THE INVENTION

It is therefore an object of the invention to provide a laser multiplexing system whereby pulse signals from a plurality of power-delivering lasers can be dependably delivered to a target system containing a plurality of power-receiving devices.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the laser multiplexing system of this invention may comprise a plurality of radiant power sources such as copper lasers and an equal number of fiber injection assemblies for receiving power and injecting the received power into a plurality of power-transmitting fibers for delivering the received power individually to a plurality of power-receiving devices such as dye laser amplifiers. In one embodiment, the copper lasers and the fiber injection assemblies are divided into groups each containing two of the copper lasers and two of the fiber injection assemblies. In each group, the two copper lasers and the two fiber injection assemblies are so arranged together with a beam splitter that the beam from each of the two copper lasers is in part transmitted through and in part reflected by the beam splitter and is received by both of the fiber injection assemblies. The power-transmitting fibers from each of the groups are so arranged as to deliver power to each of the power-receiving devices of the target system such that, even if a few of the copper lasers and/or fibers fail, the power supplied to any of the power-receiving devices will not completely drop to zero but will drop by the same proportionate amount. This is the feature of full redundancy.

In another embodiment, the laser multiplexing system is configured without a beam splitter. Full redundancy can still be obtained without pairing in groups of two the plurality of radiant power sources, such as copper lasers, with the fiber injection assemblies.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

In what follows, the invention will be described by way of an example but it is to be understood that this example is intended to be illustrative and not to be limitative.

Figure 1:
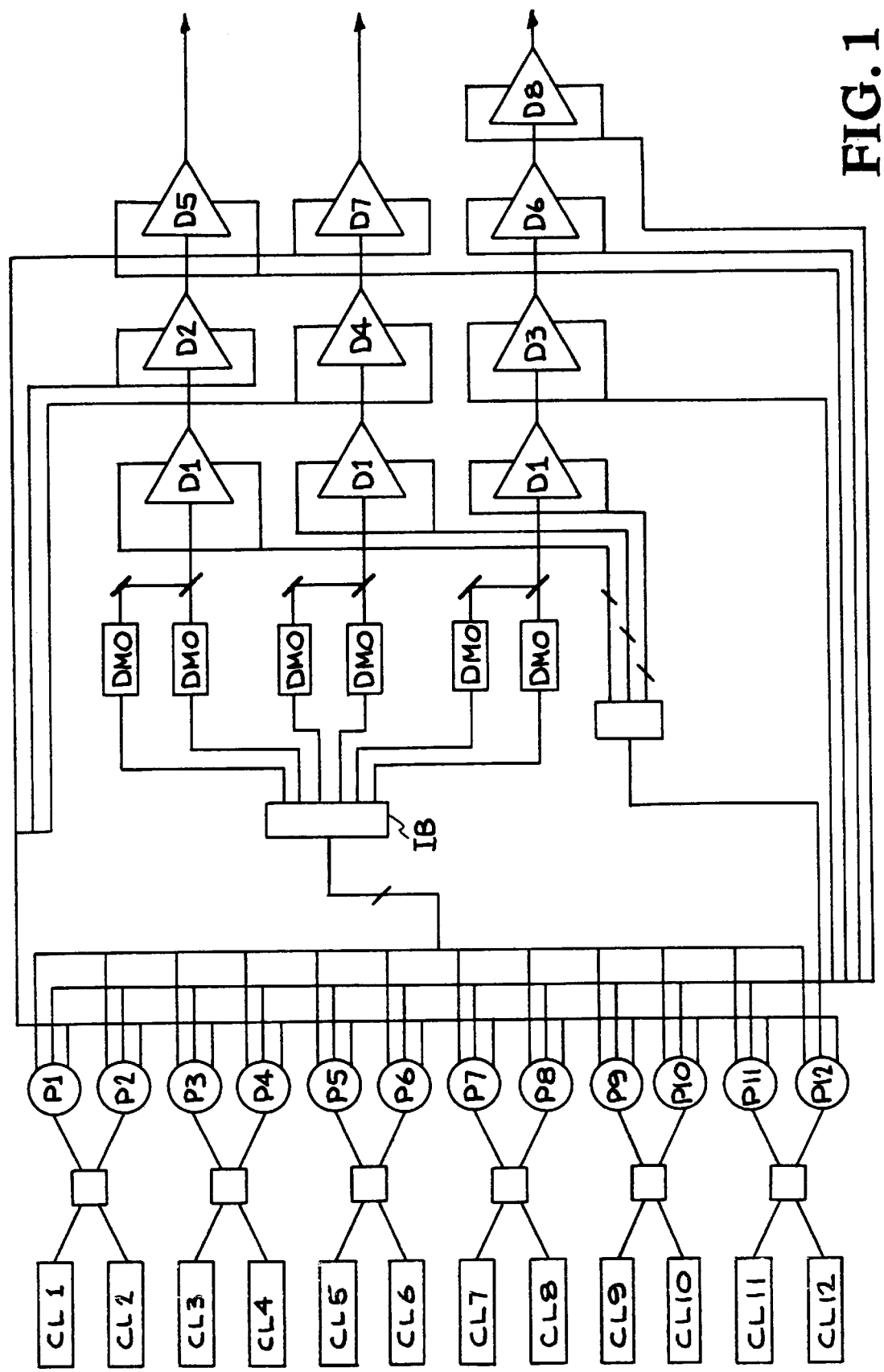
FIG. 1 is a block diagram of the first embodiment of a laser multiplexing system, according to the present invention.

FIG. 1 illustrates a laser multiplexing system wherein twelve identical copper lasers CL1 through CL12 serve as power-delivering lasers for a target system which includes dye master oscillators (DMO) and dye laser amplifiers (D1, D2, etc.) to produce three outgoing amplified laser beams. As broadly shown in FIG. 1, these twelve copper lasers are arranged in pairs, CL1 with CL2, CL3 with CL4, and so forth. Twelve fiber injection assemblies (P1 through P12) of a known kind are provided for receiving radiant power and injecting the received radiant power into a plurality of power-transmitting fibers. Not only are these twelve fiber injection assemblies similarly arranged in pairs, P1 with P2, P3 with P4, and so forth, but each of these fiber injection assembly pairs is grouped with one of the pairs of the copper lasers, the pair of Pn and Pn+1 being grouped together with the laser pair of CLn and CLn+1, where n=1, 3, 5, 7, 9 and 11. Since each of these six groups thus formed is similarly structured, only the first group including the copper lasers CL1 and CL2 and the fiber injection assemblies P1 and P2 will be described in detail by way of FIG. 2.

Figure 2:
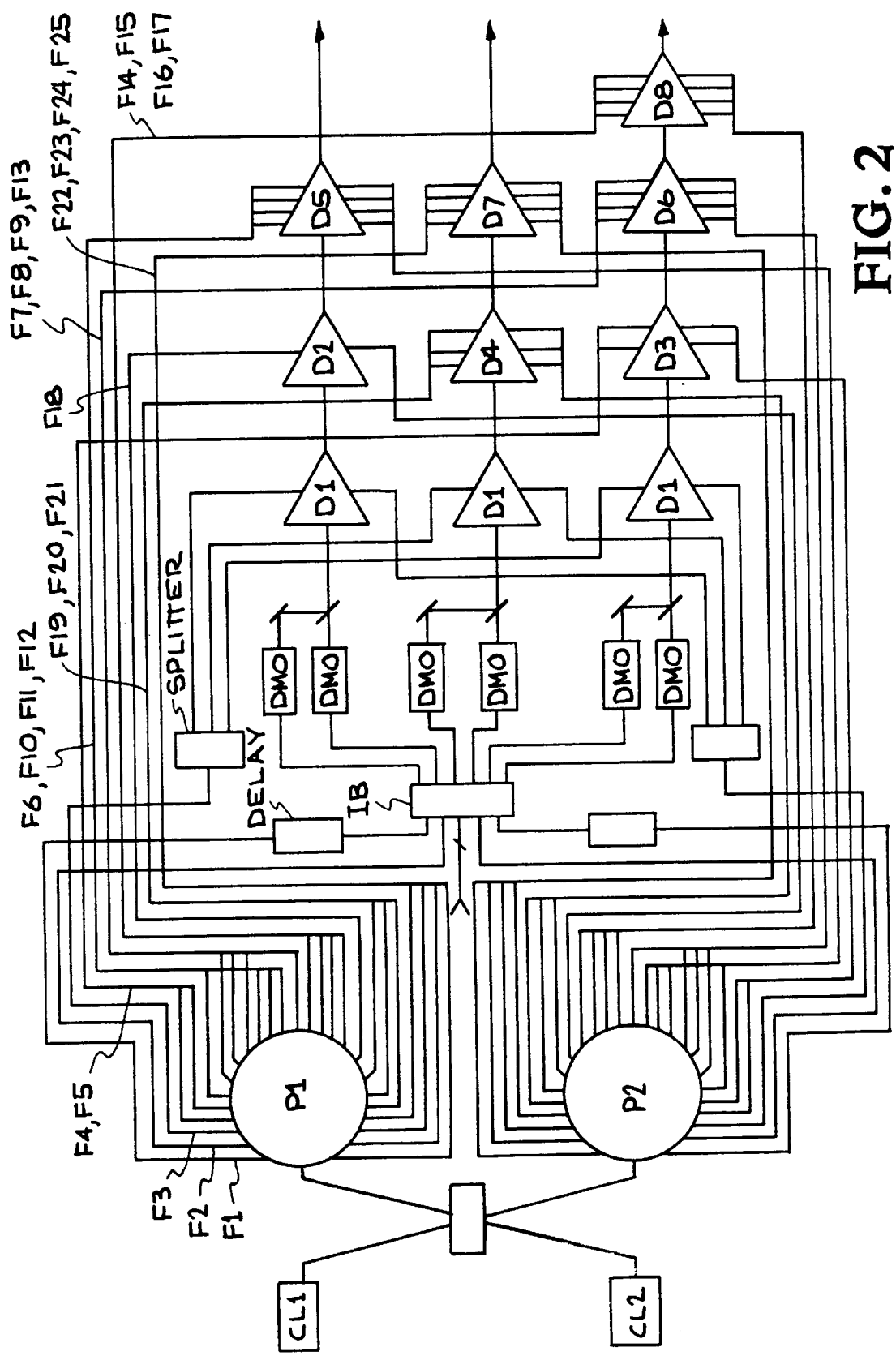
FIG. 2 is a block diagram showing a portion of FIG. 1 in more detail.

As shown in FIG. 2, a beam splitter (BS) is disposed between the copper lasers CL1 and CL2 and the fiber injection assemblies P1 and P2 in such a way that the beams emitted from the two copper lasers CL1 and CL2 will pass therethrough to reach the fiber injection assemblies P2 and P1, respectively, and be reflected thereby to reach the fiber injection assemblies P1 and P2, respectively. Thus, even if one of the lasers CL1 and CL2 failed completely, the power being received by neither of the assemblies P1 and P2 would drop totally to zero but will drop by the same proportionate amount. Next, the manner of connecting the power-transmitting fibers associated with the first fiber injection assembly P1 to the various components of the power-receiving target system will be explained in detail with reference to FIG. 2. The fibers associated with the other fiber injection assemblies P2 through P12 are similarly connected, as can be ascertained with reference to FIG. 1.

Of a total of 25 fibers transmitting power received by the first fiber injection assembly P1, two (indicated in FIG. 2 as F-1 and F-2) are connected to an integrating bar (IB) to supply power to six dye master oscillators (DMO) arranged to together emit three output beams. One of these two fibers is connected to the integrating bar directly but the other is connected through a delay line such that a broader pulse is transmitted to these dye master oscillators (DMO). The remaining 23 fibers are sequentially indicated in FIG. 2 as F-3, F-4 and so forth. The first of these fibers (F-3) transmits received power through a power splitter (SPLITTER) to the three first stage dye laser amplifiers (D1). The second stage dye laser amplifier (D2) for one of the output laser beams is pumped by power through Fiber 18. Another second stage dye laser amplifier (D3) for another of the output laser beams is pumped by power through Fibers 4 and 5. The second stage amplifier (D4) of the third of the output laser beams is pumped by power through Fibers 19, 20 and 21. Similarly, the three third stage dye laser amplifiers (D5), (D6) and (D7) of these output laser means are respectively pumped by power received through Fibers 6 and 10–12, Fibers 7–9 and 13 and Fibers 22–25, and the fourth stage dye laser amplifier (D8) is pumped by power received through Fibers 14–17.

With reference now to FIG. 1, it should be noted that the fibers from all of the twelve fiber injection assemblies (P1–P12) are similarly connected to each of the power-receiving components of the target system although such connections are not explicitly shown in FIG. 2. In summary, each of the power-receiving components of the target system is so connected as to receive power from all of the twelve power-delivering copper lasers (CL1–CL12). As a result, even if one or more of the copper lasers (CL1–CL12) fails or a few of the power-transmitting fibers break, power supply to none of the power-receiving components of the target system will drop to zero. Instead, all of the power-receiving components experience the same proportionate power drop.

Figure 3:
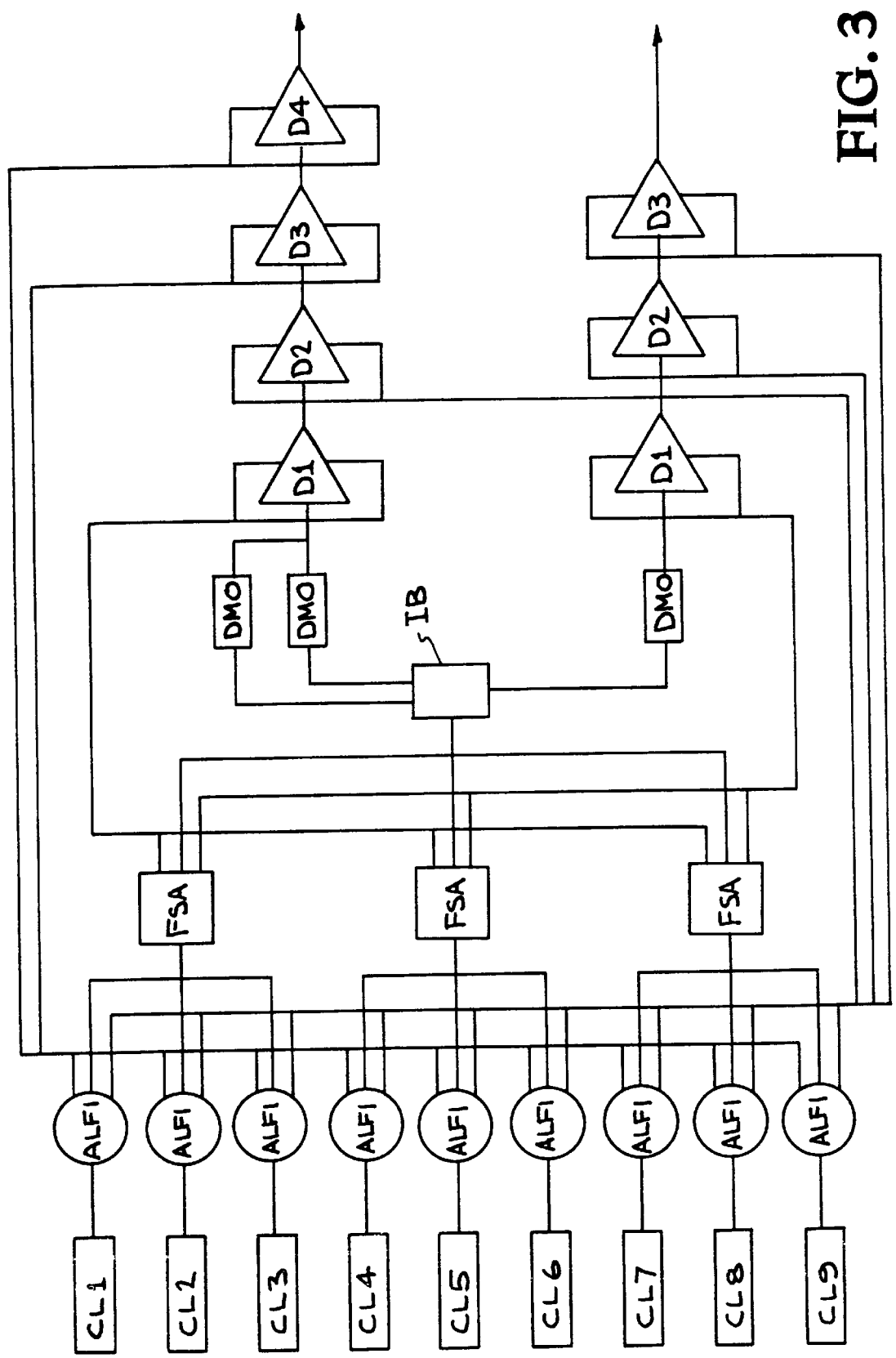
FIG. 3 is a block diagram of the second embodiment of a laser multiplexing system, according to the present invention.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, a system according to the present invention can be applied theoretically to any number of power-delivering means of any type supplying power to a target system having any number of power-receiving component devices arranged in whatever manner. The power-delivering means need not be lasers but sources of other types of radiant power. The integrating bar may be of any kind which is capable of receiving radiant power through different channels and forming a uniform flow of such received power. Moreover, a laser multiplexing system according to the present invention may be configured without a beam splitter, the radiant sources such as copper vapor lasers not being paired in groups of two. The full redundancy feature of the invention can still be obtained in this manner as shown in FIG. 3. The beam splitters can, however, reduce the number of fibers needed for redundancy. For example, without beam splitters each receiving device will need 12, 24, 36, . . . fibers. With beam splitters, as illustrated above, each receiving device needs 6, 12, 18, . . . fibers. The embodiment was chosen and described in order to best explain the principles of the invention and its practical application to thereby enable others skilled in the art to best utilize the invention in various embodiments and with various modifications as are suited to the particular use contemplated. It is intended that any variations and modifications of the disclosed example which may be apparent to a person skilled in the art are included within the scope of this invention.

What is claimed is:

1. A multiplexing system comprising
    a plurality of radiant power sources for emitting a beam of power-carrying radiation;
    a target system including a plurality of power-receiving devices; and
    multiplexing means for delivering power from each of said sources to each of said power-receiving devices, said multiplexing means including beam splitters, power-transmitting fibers and fiber injection means for receiving power and injecting said power received thereby into a plurality of said fibers to individually deliver said power received thereby to said power-receiving devices;
    said sources and said fiber injection means being arranged in groups, each of said groups containing two of said sources, two of said fiber injection means and one of said beam splitters; said two sources, said two fiber injection means and said one beam splitter of each of said groups being so arranged that the beam emitted from each of said two sources is in part transmitted through and in part reflected by said one beam splitter and received by both of said fiber injection means.

2. The multiplexing system of claim 1 wherein said radiant power sources are copper lasers.

3. The multiplexing system of claim 1 wherein said multiplexing means includes integrating bar means for receiving power through a plurality of channels and forming a uniform flow of received power, said integrating bar means being connected to and receiving power from each of said groups and being connected to and delivering power to some of said power-receiving devices.

4. The multiplexing system of claim 1 wherein said power-receiving devices include dye master oscillators and dye laser amplifiers.

5. The multiplexing system of claim 2 wherein said power-receiving devices include dye master oscillators and dye laser amplifiers.

6. A multiplexing system comprising:
    a plurality of radiant power sources for emitting a beam of power-carrying radiation;
    a target system including a plurality of power-receiving devices, wherein said power receiving devices include oscillators and laser amplifiers; and
    multiplexing means for delivering power from each of said sources to each of said power-receiving devices, said multiplexing means including beam splitters, power-transmitting fibers and fiber injection means for receiving power and injecting said power received thereby into a plurality of said fibers, and fiber splitter assemblies, each said assemblies receiving power through said plurality of said fibers from said fiber injection means arranged in groups, to deliver said power received thereby to said power-receiving devices.

7. The multiplexing system of claim 6 wherein said multiplexing means includes integrating bar means for receiving power through a plurality of channels and forming a uniform flow of received power, said integrating bar means being connected to and receiving power from each said assemblies and being connected to and delivering power to some of said power-receiving devices.

8. The multiplexing system of claim 6 wherein said radiant power sources are copper lasers.

9. The multiplexing system of claim 6 wherein said oscillators and laser amplifiers include dye master oscillators and dye laser amplifiers.

10. The multiplexing system of claim 7 wherein said oscillators and laser amplifiers include dye master oscillators and dye laser amplifiers.

11. A multiplexing system comprising:

a plurality of radiant power sources for emitting a beam of power-carrying radiation;

a target system including a plurality of power-receiving devices; and multiplexing means for delivering power from each of said sources to each of said power-receiving devices, said multiplexing means including power-transmitting fibers and fiber injection means for receiving power and infecting said power received thereby into a plurality of said fibers, and fiber splitter assemblies, each said assemblies receiving power through said plurality of said fibers from said fiber injection means arranged in groups, to deliver said power received thereby to said power receiving devices, said multiplexing means further including integrating bar means for receiving power through a plurality of channels and forming a uniform flow of received power, said integrating bar means being connected to and receiving power from each said assemblies and being connected to and delivering power to some of said power receiving devices.

* * * * *